(12) United States Patent
Lee et al.

(10) Patent No.: US 10,835,980 B2
(45) Date of Patent: Nov. 17, 2020

(54) AUTOMATIC WIRE ARRANGING DEVICE

(71) Applicant: Cheng Uei Precision Industry Co., Ltd., New Taipei (TW)

(72) Inventors: Peng Yuan Lee, New Taipei (TW); Jun Long Wu, New Taipei (TW); Ming Tsung Lee, New Taipei (TW); Chih Hau Sun, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 267 days.

(21) Appl. No.: 15/989,282

(22) Filed: May 25, 2018

(65) Prior Publication Data

US 2019/0358723 A1 Nov. 28, 2019

(51) Int. Cl.

| | | |
|---|---|---|
| *B23P 19/00* | (2006.01) | |
| *B23K 3/08* | (2006.01) | |
| *G06K 9/00* | (2006.01) | |
| *B25B 11/02* | (2006.01) | |
| *B23K 101/32* | (2006.01) | |

(52) U.S. Cl.
CPC .............. *B23K 3/087* (2013.01); *B25B 11/02* (2013.01); *G06K 9/00624* (2013.01); *B23K 2101/32* (2018.08)

(58) Field of Classification Search
CPC .. G06K 9/00624; G06K 9/20; B23K 2101/32; B23K 3/087; B25B 11/02
See application file for complete search history.

(56) References Cited

U.S. PATENT DOCUMENTS 4,559,702 A * 12/1985 Maack .................. H01R 43/28
198/477.1
2019/0356099 A1* 11/2019 Lo ....................... H01B 13/0036

* cited by examiner

*Primary Examiner* — Paul D Kim
(74) *Attorney, Agent, or Firm* — Lin & Associates Intellectual Property, Inc.

(57) ABSTRACT

An automatic wire arranging device includes a controller, at least one driving device electrically connected with the controller, a first wire clamping jig connected with the at least one driving device, a second wire clamping jig disposed to the first wire clamping jig, at least one charge-coupled device camera connected with the controller, and at least one puncher pin connected with the at least one driving device. The first wire clamping jig opens a plurality of first clamping slots. Each of the plurality of the first clamping slots opens a through-hole. The second wire clamping jig opens a plurality of second clamping slots. The at least one puncher pin is capable of penetrating through the through-hole and pushing against a core wire to be away from one of the plurality of the first clamping slots and be blocked in one of the plurality of the second clamping slots.

10 Claims, 6 Drawing Sheets

AUTOMATIC WIRE ARRANGING DEVICE

BACKGROUND OF THE INVENTION

1. Field of the Invention

The present invention generally relates to a wire arranging device, and more particularly to an automatic wire arranging device and an automatic wire arranging method applied in the automatic wire arranging device.

2. The Related Art

Generally, when a conventional cable having multiple core wires proceed spot soldering, colors of the core wires are all distinguished by eyes of workers, and the core wires are manually placed to corresponding clamping slots of a wire arranging jig according to the colors of the core wires separately, then the core wires are spot soldered one by one. However, because the workers are easily tired and distinguish the colors wrongly, the core wires are pressed into wrong positions and the wrongly soldered core wires are increased to make rates of repairing and even scrapping the core wires high. In addition, in a process of arranging the core wires, more workers are needed and speeds of arranging the core wires are lower to increase working hours. As a result, a cost of spot soldering the core wires of the conventional cable is higher.

SUMMARY OF THE INVENTION

An object of the present invention is to provide an automatic wire arranging device for proceeding automatically arranging a plurality of different characteristic core wires of a cable. The automatic wire arranging device includes a controller, at least one driving device electrically connected with the controller, a first wire clamping jig, a second wire clamping jig, at least one charge-coupled device camera and at least one puncher pin. A top surface of the first wire clamping jig opens a plurality of first clamping slots arranged transversely for receiving the plurality of the core wires. A bottom wall of each of the plurality of the first clamping slots opens a through-hole penetrating through a bottom surface of the first wire clamping jig. The first wire clamping jig is connected with the at least one driving device. The at least one driving device is capable of driving the first wire clamping jig to perform transverse reciprocating movements. The second wire clamping jig is disposed to a top of the first wire clamping jig. A bottom surface of the second wire clamping jig opens a plurality of second clamping slots arranged transversely. The at least one charge-coupled device camera is connected with the controller. The at least one charge-coupled device camera faces towards the plurality of the core wires received in the plurality of the first clamping slots. The at least one charge-coupled device camera is used for taking characteristic information of the plurality of the core wires received in the plurality of the first clamping slots separately, and the characteristic information of each of the plurality of the core wires is transmitted to the controller. The at least one puncher pin is movably disposed to a bottom of the first wire clamping jig. The at least one puncher pin is connected with the at least one driving device. The at least one driving device drives the at least one puncher pin to be capable of performing up-down reciprocating movements with respect to the first wire clamping jig. When the at least one puncher pin moves upward, the at least one puncher pin is capable of penetrating through the through-hole and pushing against the core wire received in one of the plurality of the first clamping slots to be away from the one of the plurality of the first clamping slots and be blocked in one of the plurality of the second clamping slots corresponding to the one of the plurality of the first clamping slots.

Another object of the present invention is to provide an automatic wire arranging device for proceeding automatically arranging a plurality of different characteristic core wires of a cable. The automatic wire arranging device includes a first wire clamping jig, a second wire clamping jig and at least one puncher pin aligned with the through-hole of one of the plurality of the first clamping slots. The first wire clamping jig has a first surface. The first surface of the first wire clamping jig opens a plurality of first clamping slots for receiving the plurality of the core wires. A portion of each of the plurality of the first clamping slots extends along a direction perpendicular to the first surface to form a through-hole penetrating through the first wire clamping jig. The second wire clamping jig is disposed to the first wire clamping jig. The second wire clamping jig has a second surface facing to the first surface. The second surface of the second wire clamping jig opens a plurality of second clamping slots facing to the plurality of the first clamping slots. At least two of the first wire clamping jig, the second wire clamping jig and the at least one puncher pin are moved, and then the at least one puncher pin passes through the through-hole and pushes the plurality of the different characteristic core wires received in the plurality of the first clamping slots needless of being according to preset arranging positions to make the plurality of the different characteristic core wires blocked in the plurality of the second clamping slots according to the preset arranging positions respectively.

Another object of the present invention is to provide an automatic wire arranging method applied in an automatic wire arranging device to automatically arrange a plurality of different characteristic core wires of a cable. The automatic wire arranging device includes a first wire clamping jig, a second wire clamping jig disposed to the first wire clamping jig, and at least one puncher pin disposed to the first wire clamping jig. The first wire clamping jig opens a plurality of first clamping slots. The second wire clamping jig opens a plurality of second clamping slots. Specific steps of the automatic wire arranging method are described hereinafter. Position the different characteristic core wires in the plurality of the first clamping slots needless of being according to preset arranging positions, respectively. Position the second wire clamping jig to the first wire clamping jig with the plurality of the first clamping slots facing to the plurality of the second clamping slots. Move at least two of the first wire clamping jig, the second wire clamping jig and the at least one puncher pin, and then push the plurality of the different characteristic core wires to break away from the plurality of the first clamping slots to make the plurality of the different characteristic core wires blocked in the plurality of the second clamping slots according to the preset arranging positions by distinguishing the plurality of the different characteristic core wires.

As described above, when the automatic wire arranging device is in use, the plurality of the different characteristic core wires which need arranging are capable of being received in the plurality of the first clamping slots randomly by operators, the controller, the at least one driving device, the second wire clamping jig, the at least one charge-coupled device camera and the at least one puncher pin cooperate with one another to realize automatically distinguishing different characteristics of the plurality of the core wires, including colors of the plurality of the core wires to arrange the plurality of the different characteristic core wires in the plurality of the corresponding second clamping slots separately, so that less workers are needed to save manpower and working hours are decreased, speeds of the automatic wire arranging device arranging the plurality of the different characteristic core wires of the cable are improved and defect rates of the automatic wire arranging device arranging the plurality of the different characteristic core wires of the cable are lowered. As a result, a cost of spot soldering the different characteristic core wires of the cable is lower.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
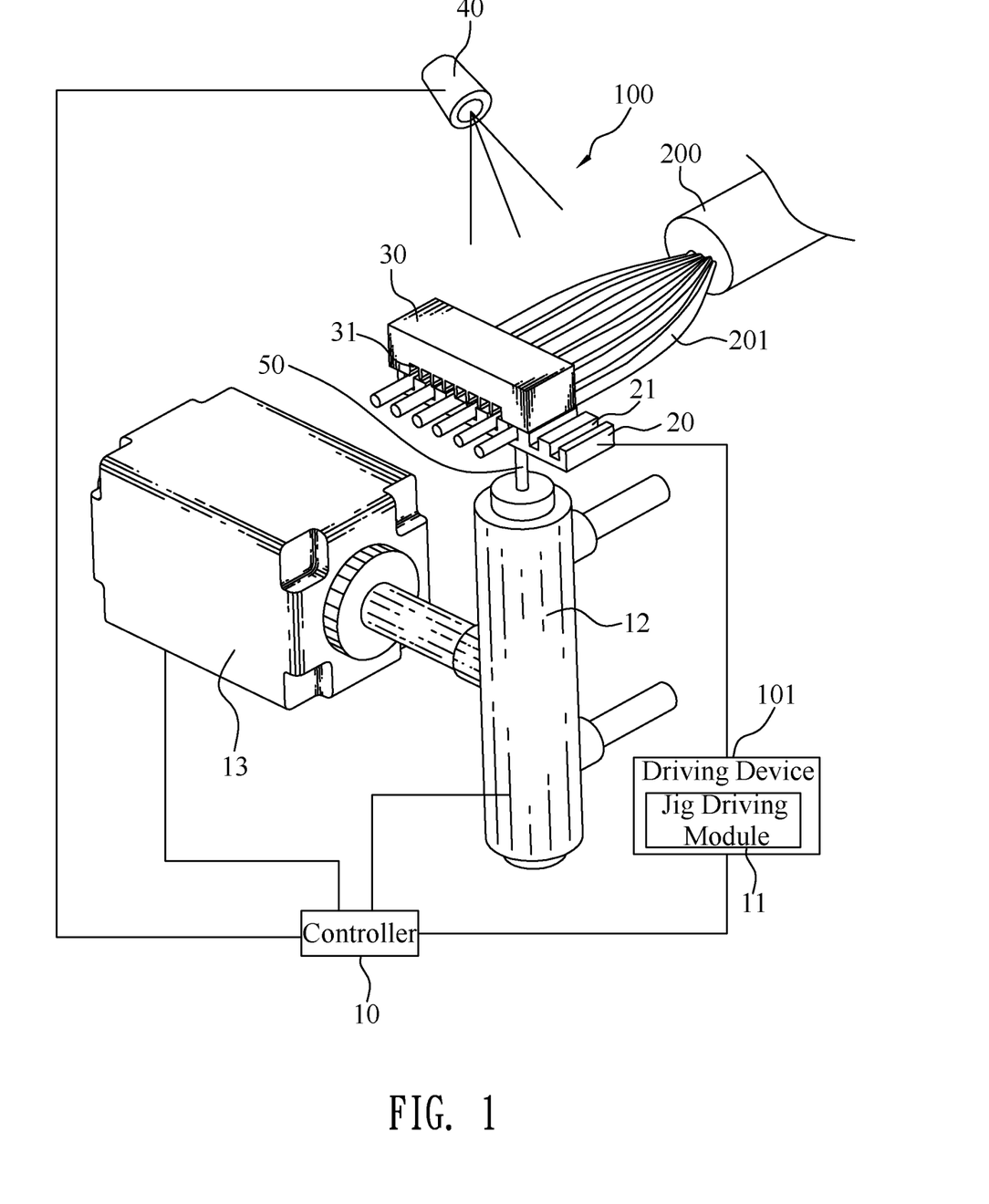
FIG. 1 is a diagrammatic drawing of an automatic wire arranging device in accordance with a first preferred embodiment of the present invention.
Figure 2:
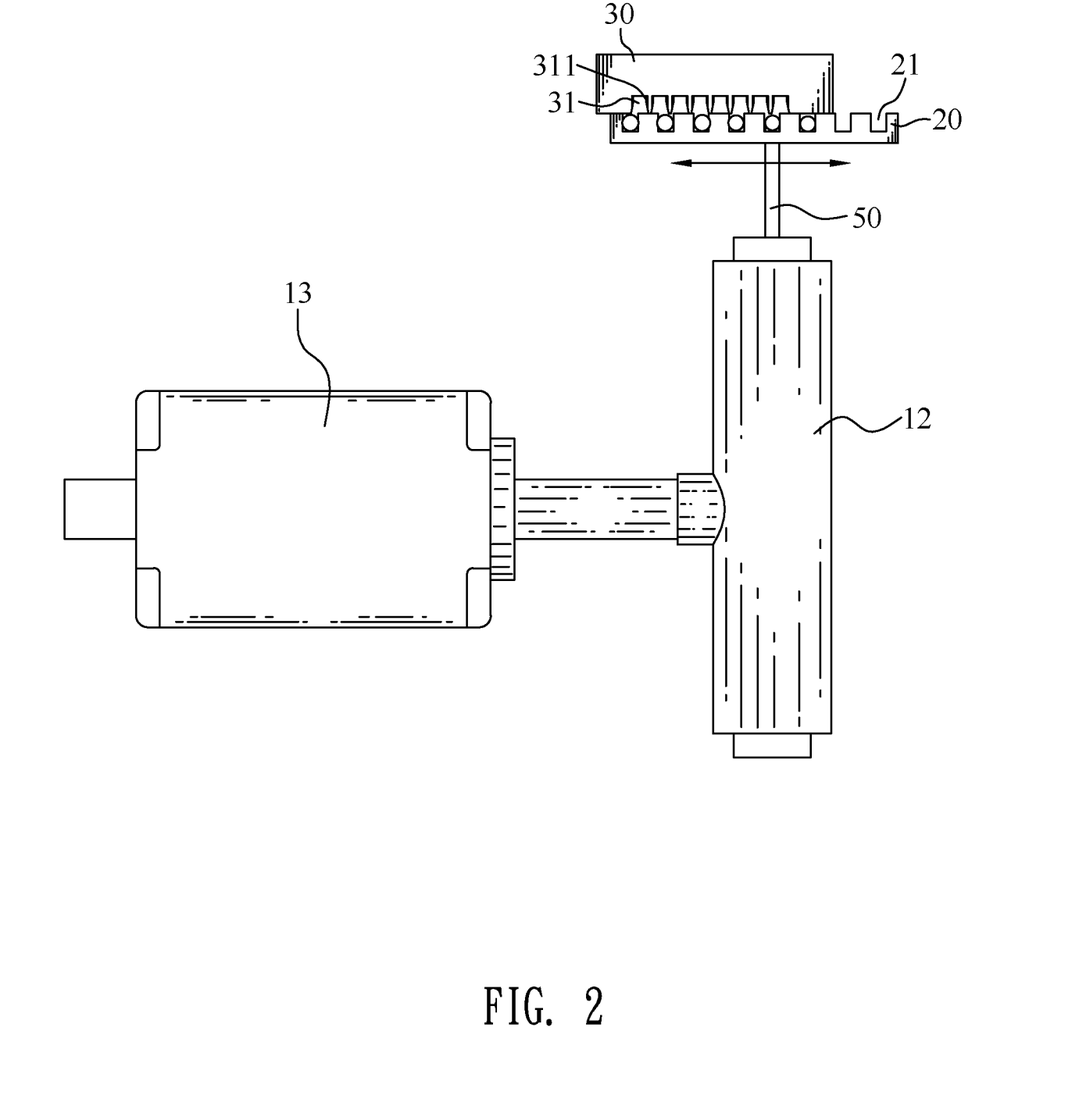
FIG. 2 is a front view of the automatic wire arranging device of FIG. 1.

With reference to FIG. 1, an automatic wire arranging device 100 in accordance with a first preferred embodiment of the present invention is shown. The automatic wire arranging device 100 is used for proceeding automatically arranging a plurality of different characteristic core wires 201 of a cable 200. Each of the plurality of the core wires 201 has different characteristics. The different characteristics of each of the plurality of the core wires 201 include a contour of each of the plurality of the core wires 201, a diameter of each of the plurality of the core wires 201 and a color of each of the plurality of the core wires 201. In the first preferred embodiment, the automatic wire arranging device 100 is used for proceeding automatically arranging the plurality of the different-colored core wires 201 of the cable 200. The automatic wire arranging device 100 includes a controller 10, at least one driving device 101, a first wire clamping jig 20, a second wire clamping jig 30, at least one charge-coupled device (CCD) camera 40 and at least one puncher pin 50.

Referring to FIG. 1 again, the at least one driving device 101 is electrically connected with the controller 10. In the first preferred embodiment, the at least one driving device 101 includes a jig driving module 11, a cylinder driver 12 and a driving motor 13. The jig driving module 11, the cylinder driver 12 and the driving motor 13 are electrically connected with the controller 10.

Figure 3:
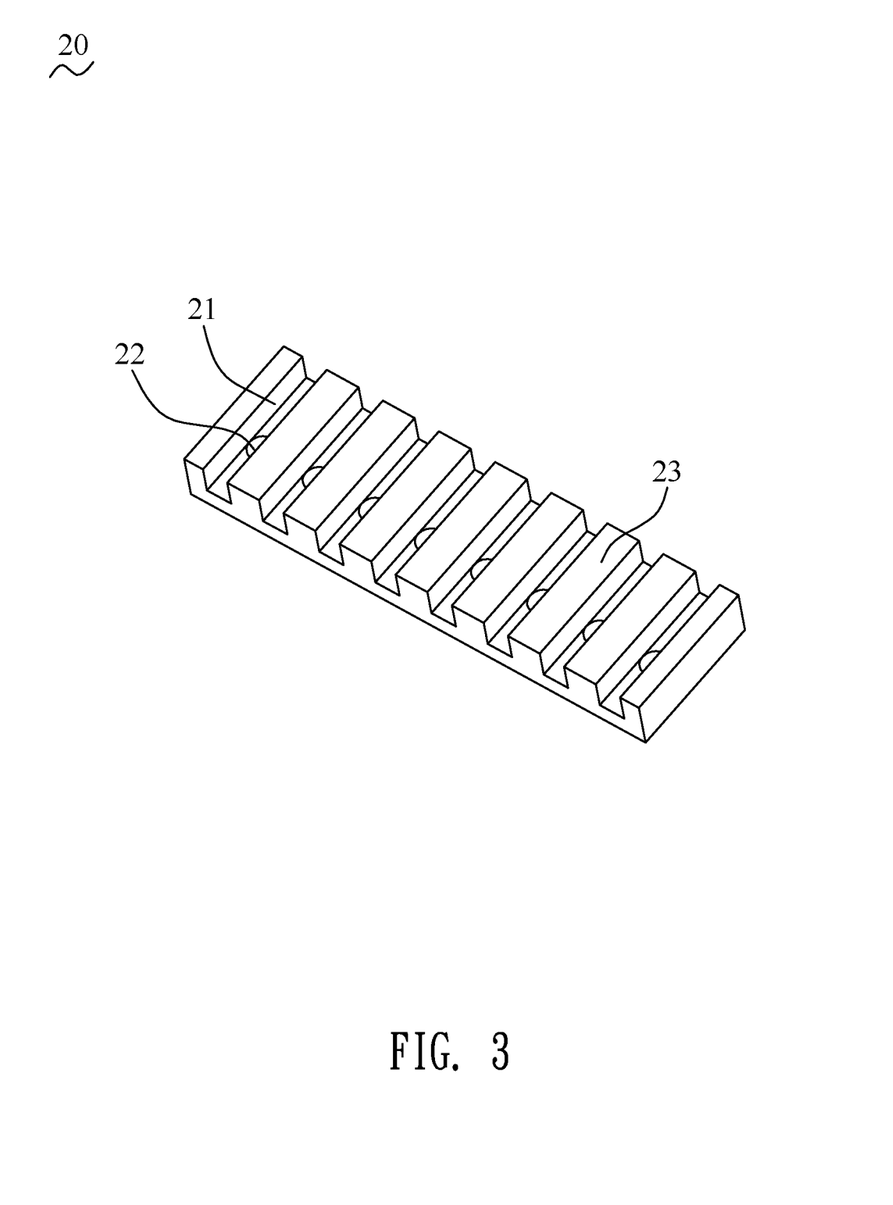
FIG. 3 is a stereogram showing a first wire clamping jig of the automatic wire arranging device in accordance with the present invention.

Referring to FIG. 1 and FIG. 3, the first wire clamping jig 20 is of a rectangular plate shape. The first wire clamping jig 20 has a first surface 23. The first surface 23 opens a plurality of first clamping slots 21 arranged transversely for receiving the plurality of the different characteristic core wires 201. The first surface 23 of the first wire clamping jig 20 is defined as a top surface of the first wire clamping jig 20. The plurality of the first clamping slots 21 are opened on the top surface of the first wire clamping jig 20 and are arranged transversely for receiving the plurality of the different-colored core wires 201. Each of the plurality of the first clamping slots 21 extends in an anterior-posterior direction and penetrates through a front surface and a rear surface of the first wire clamping jig 20. A portion of each of the plurality of the first clamping slots 21 extends along a direction perpendicular to the first surface 23 to form a through-hole 22 penetrating through the first wire clamping jig 20. A bottom wall of each of the plurality of the first clamping slots 21 opens the through-hole 22 penetrating through a bottom surface of the first wire clamping jig 20. The first wire clamping jig 20 is connected with the jig driving module 11 of the at least one driving device 101. The jig driving module 11 of the at least one driving device 101 is capable of driving the first wire clamping jig 20 to perform transverse reciprocating movements. In the first preferred embodiment, the jig driving module 11 is a stepper motor.

Referring to FIG. 1 to FIG. 4, the second wire clamping jig 30 is disposed to a top of the first wire clamping jig 20. The second wire clamping jig 30 has a second surface 32 facing to the first surface 23. The second surface 32 of the second wire clamping jig 30 opens a plurality of second clamping slots 31 facing to the plurality of the first clamping slots 21. The second surface 32 of the second wire clamping jig 30 is defined as a bottom surface of the second wire clamping jig 30. The plurality of the second clamping slots 31 are opened on the bottom surface of the second wire clamping jig 30 and are arranged transversely. A bottom surface of the second wire clamping jig 30 opens the plurality of second clamping slots 31 arranged transversely. Each of the plurality of the second clamping slots 31 extends in the anterior-posterior direction and penetrates through a front surface and a rear surface of the second wire clamping jig 30. Two facing inner surfaces of two opposite side walls of each of the plurality of the second clamping slots 31 protrude towards each other to form two protruding portions 311. Upper portions of the two facing inner surfaces of the two opposite side walls of each of the plurality of the second clamping slots 31 slantwise extend outward away from each other to form two guiding slopes 312. A distance between tops of the two guiding slopes 312 is wider than a distance between bottoms of the two guiding slopes 312.

Figure 4:
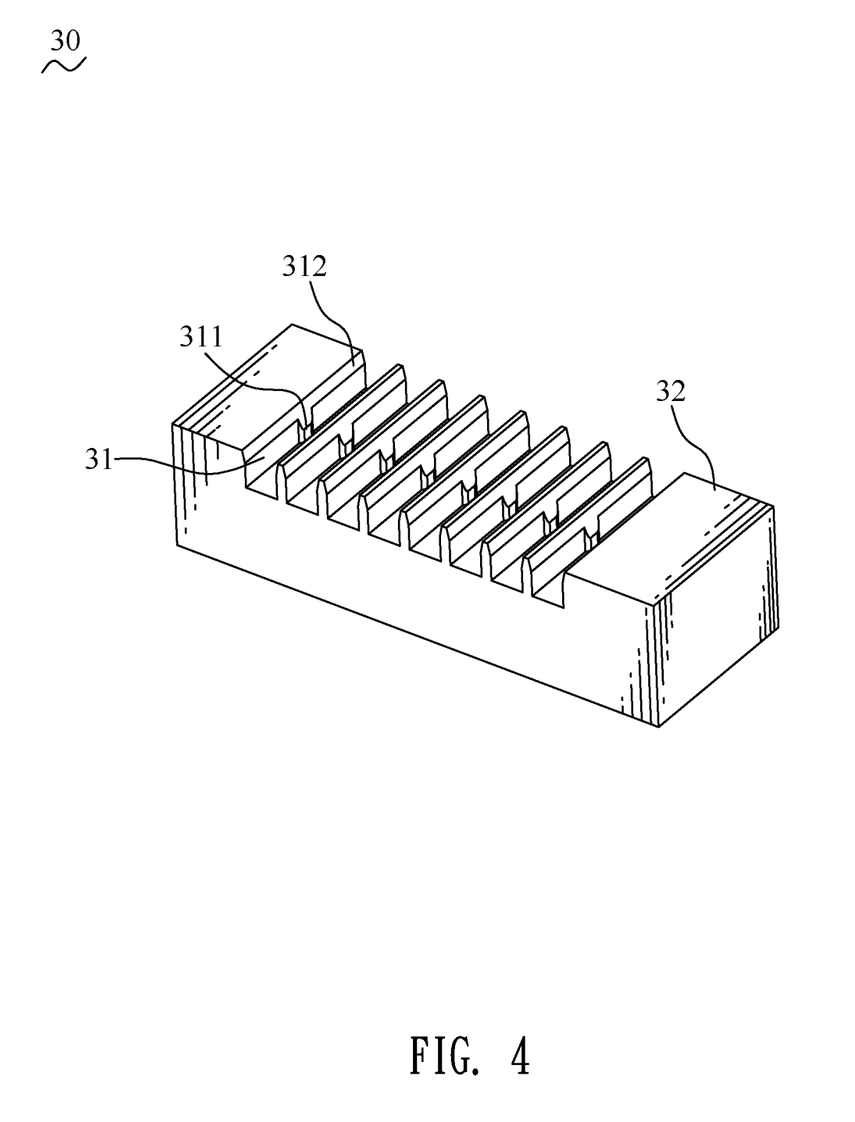
FIG. 4 is a stereogram showing a second wire clamping jig of the automatic wire arranging device in accordance with the present invention.

Referring to FIG. 1, FIG. 3 and FIG. 4, the at least one charge-coupled device camera 40 is connected with the controller 10. The at least one charge-coupled device camera 40 faces towards the plurality of the core wires 201 received in the plurality of the first clamping slots 21 for distinguishing the different characteristics of each of the plurality of the core wires 201. The at least one charge-coupled device (CCD) camera 40 is used for taking characteristic information of the plurality of the core wires 201 received in the plurality of the first clamping slots 21 separately, and the characteristic information of each of the plurality of the core wires 201 is transmitted to the controller 10. The characteristic information includes color information.

The at least one puncher pin 50 is movably disposed to a bottom of the first wire clamping jig 20. The at least one puncher pin 50 is connected with the cylinder driver 12 of the at least one driving device 101. The cylinder driver 12 of the at least one driving device 101 drives the at least one puncher pin 50 to be capable of performing up-down reciprocating movements with respect to the first wire clamping jig 20. The at least one puncher pin 50 is aligned with the through-hole 22 of one of the plurality of the first clamping slots 21. At least two of the first wire clamping jig 20, the second wire clamping jig 30 and the at least one puncher pin 50 are moved, and then the at least one puncher pin 50 passes through the through-hole 22 and pushes the plurality of the different characteristic core wires 201 received in the plurality of the first clamping slots 21 needless of being according to preset arranging positions to make the plurality of the different characteristic core wires 201 blocked in the plurality of the second clamping slots 31 according to the preset arranging positions, respectively. When the at least one puncher pin 50 moves upward, the at least one puncher pin 50 is capable of penetrating through the through-hole 22 of the one of the plurality of the first clamping slots 21 and pushing against the core wire 201 received in the one of the plurality of the first clamping slots 21 to be away from the one of the plurality of the first clamping slots 21 and be blocked in one of the plurality of the second clamping slots 31 corresponding to the one of the plurality of the first clamping slots 21. The cylinder driver 12 is mounted to the driving motor 13. The driving motor 13 is capable of driving the cylinder driver 12 to drive the at least one puncher pin 50 to move transversely.

Referring to FIG. 1 to FIG. 5, a wire arranging process of the automatic wire arranging device 100 applies an automatic wire arranging method to arrange the plurality of the different-colored core wires 201 of the cable 200 is described as follows. At first, the plurality of the different-colored core wires 201 of the cable 200 are artificially blocked in the plurality of the first clamping slots 21, separately. After the plurality of the different-colored core wires 201 of the cable 200 are fastened in the plurality of the first clamping slots 21 separately, the controller 10 controls the jig driving module 11 to drive the first wire clamping jig 20 to move transversely to be located under the second wire clamping jig 30. The at least one charge-coupled device camera 40 takes the colors of the plurality of the core wires 201 blocked in the plurality of the first clamping slots 21 separately, and the color information of each of the plurality of the core wires 201 of the cable 200 is transmitted to the controller 10.

Figure 5:
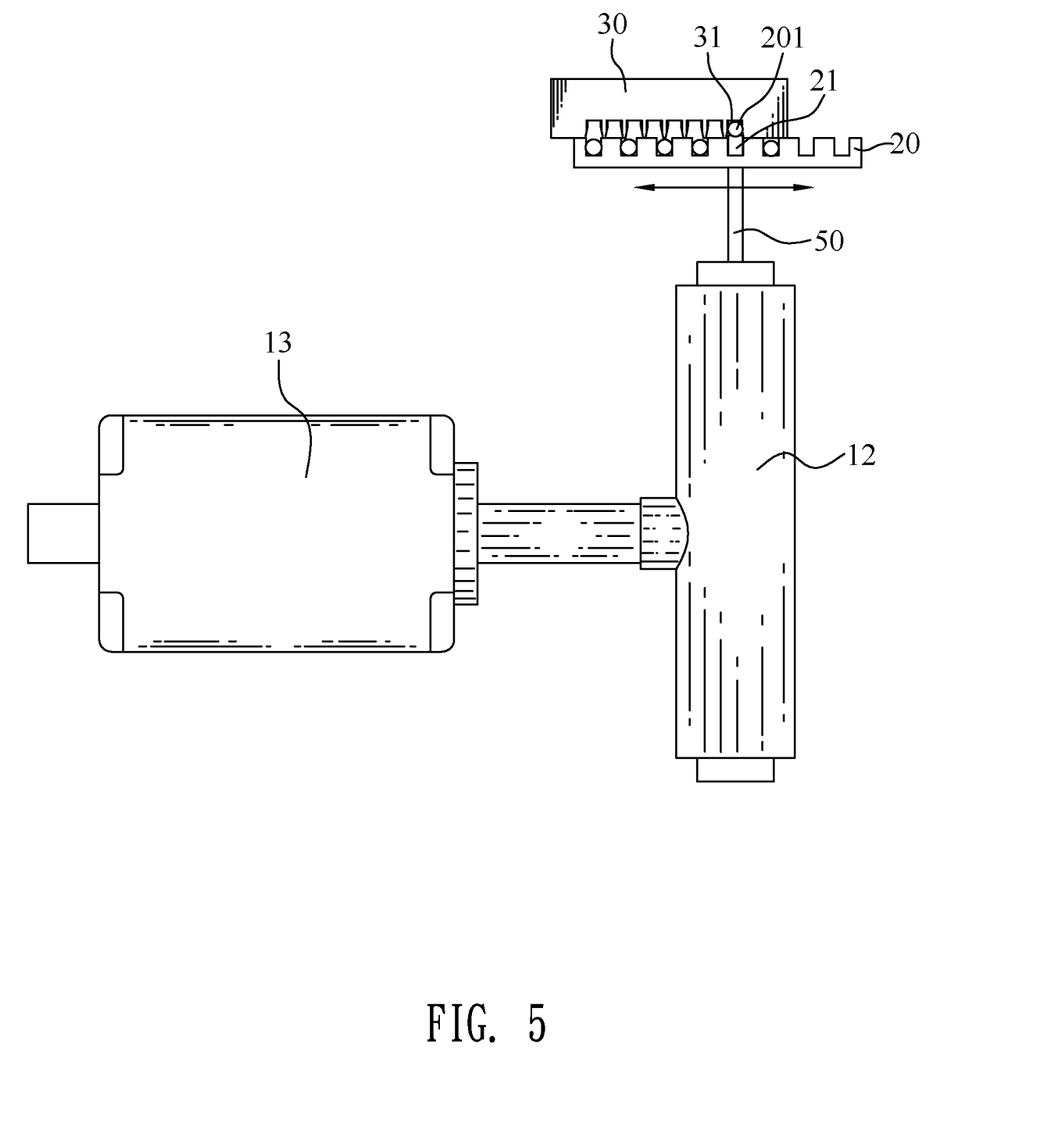
FIG. 5 is a diagrammatic drawing of a wire arranging process of the automatic wire arranging device in accordance with the present invention.
Figure 6:
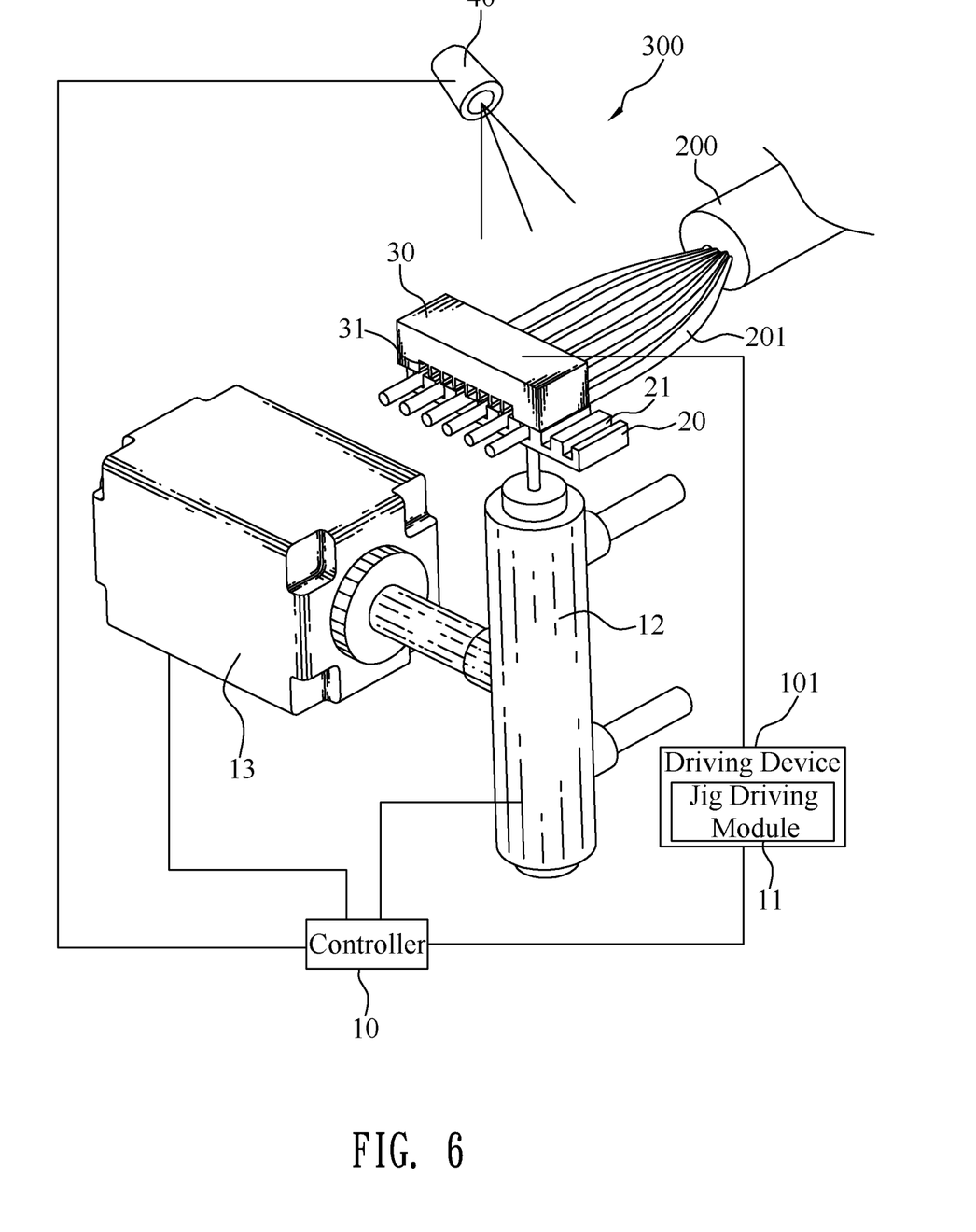
FIG. 6 is a diagrammatic drawing of an automatic wire arranging device in accordance with a second preferred embodiment of the present invention.

The controller 10 controls the jig driving module 11 to drive the first wire clamping jig 20 to perform a transverse movement according to preset programs (set which colors of the plurality of the core wires 201 are mounted in the plurality of the second clamping slots 31 separately in sequence), so that one of the plurality of the core wires 201 is moved under one of the plurality of the second clamping slots 31 of the second wire clamping jig 30 corresponding to a color of the one of the plurality of the core wires 201. The controller 10 controls the driving motor 13 to drive the cylinder driver 12 to drive the at least one puncher pin 50 to move to be corresponding to and under the through-hole 22. Afterwards, the controller 10 controls the cylinder driver 12 to drive the at least one puncher pin 50 to move upward, the at least one puncher pin 50 passes through the through-hole 22 and pushes against the one of the plurality of the core wires 201 corresponding to the at least one puncher pin 50 to move upward, the one of the plurality of the core wires 201 breaks away from the one of the plurality of the first clamping slots 21 and then is blocked in the one of the plurality of the second clamping slots 31 corresponding to the one of the plurality of the first clamping slots 21.

Under a condition of the plurality of the core wires 201 having certain deformations, the plurality of the core wires 201 are still able to be guided to the plurality of the second clamping slots 31 separately and accurately by virtue of the guiding slopes 312 of side walls of the plurality of the second clamping slots 31. In addition, the plurality of the core wires 201 are capable of being blocked in the plurality of the second clamping slots 31 steadily by virtue of the two protruding portions 311 of the two opposite side walls of each of the plurality of the second clamping slots 31 for preventing the plurality of the core wires 201 from falling off. After the corresponding one of the plurality of the second clamping slots 31 of the second wire clamping jig 30 clamps the one of the plurality of the core wires 201, the controller 10 controls the cylinder driver 12 to drive the at least one puncher pin 50 to move downward to an original position. Then, a next core wire 201 is proceeded being arranged. In this way, the plurality of the core wires 201 in the plurality of the first clamping slots 21 proceed being correspondingly arranged in the plurality of the second clamping slots 31 of the second wire clamping jig 30 separately in sequence according to different colors of the plurality of the core wires 201, so that the first wire clamping jig 20 is moved away, the plurality of the different-colored core wires 201 complete being arranged in the plurality of the second clamping slots 31 of the second wire clamping jig 30 according to the preset arranging positions separately.

Specific steps of the automatic wire arranging method applied in the automatic wire arranging device 100 to arrange the plurality of the different characteristic core wires 201 of the cable 200 are described as follows. Firstly, position the different characteristic core wires 201 in the plurality of the first clamping slots 21 needless of being according to the preset arranging positions respectively. Secondly, position the second wire clamping jig 30 to the first wire clamping jig 20 with the plurality of the first clamping slots 21 facing to the plurality of the second clamping slots 31. Thirdly, move at least two of the first wire clamping jig 20, the second wire clamping jig 30 and the at least one puncher pin 50, and then push the plurality of the different characteristic core wires 201 to break away from the plurality of the first clamping slots 21 to make the plurality of the different characteristic core wires 201 blocked in the plurality of the second clamping slots 31 according to the preset arranging positions by distinguishing the plurality of the different characteristic core wires 201. Fourthly, move away the first wire clamping jig 20, an action of the plurality of the different characteristic core wires 201 completing being fastened to the second wire clamping jig 30.

Preferably, move the first wire clamping jig 20 and the at least one puncher pin 50 relative to the second wire clamping jig 30 to align the at least one puncher pin 50 and the through-hole 22 of the one of the plurality of the first clamping slots 21 with the one of the plurality of the second clamping slots 31 of the second wire clamping jig 30 by distinguishing the plurality of the different characteristic core wires 201.

Preferably, move the first wire clamping jig 20 and the second wire clamping jig 30 relative to the at least one puncher pin 50 to align the at least one puncher pin 50 and the through-hole 22 of the one of the plurality of the first clamping slots 21 with the one of the plurality of the second clamping slots 31 of the second wire clamping jig 30 by distinguishing the plurality of the different characteristic core wires 201.

Preferably, move the at least one puncher pin 50 and the second wire clamping jig 30 relative to the first wire clamping jig 20 to align the at least one puncher pin 50 and the through-hole 22 of the one of the plurality of the first clamping slots 21 with the one of the plurality of the second clamping slots 31 of the second wire clamping jig 30 by distinguishing the plurality of the different characteristic core wires 201.

Referring to FIG. 2 to FIG. 6, an automatic wire arranging device 300 in accordance with a second preferred embodiment of the present invention is shown. The first wire clamping jig 20 is without being connected with the jig driving module 11 of the at least one driving device 101. The second wire clamping jig 30 is connected with the jig driving module 11 of the at least one driving device 101. The jig driving module 11 of the at least one driving device 101 is capable of driving the second wire clamping jig 30 to perform transverse reciprocating movements. Differences between a wire arranging process of the automatic wire arranging device 300 in accordance with the second preferred embodiment and the wire arranging process of the automatic wire arranging device 100 in accordance with the first preferred embodiment are described as follows. After the plurality of the different-colored core wires 201 of the cable 200 are artificially blocked in the plurality of the first clamping slots 21 separately, the one of the second clamping slots 31 of the second wire clamping jig 30 is located over the one of the core wires 201 of which a color is corresponding to the one of the second clamping slots 31 of the second wire clamping jig 30. The core wire 201 blocked in the one of the plurality of the first clamping slots 21 is pushed to be away from the one of the plurality of the first clamping slots 21 and blocked in the one of the plurality of second clamping slots 31 corresponding to the one of the plurality of the first clamping slots 21 by virtue of a cooperation of the controller 10, the driving motor 13, the cylinder driver 12 and the at least one puncher pin 50. Afterwards, according to the above-mentioned wire arranging process of the automatic wire arranging device 300 in accordance with the second preferred embodiment, the plurality of the different-colored core wires 201 of the cable 200 are completed being arranged according to the preset arranging positions separately. Specific steps of the automatic wire arranging method applied in the automatic wire arranging device 100 in accordance with the first preferred embodiment are different from specific steps of an automatic wire arranging method applied in the automatic wire arranging device 300 in accordance with the second preferred embodiment.

In addition, the at least one charge-coupled device (CCD) camera 40 is able to be replaced by a complementary metal oxide semiconductor (CMOS) camera (not shown).

As described above, when the automatic wire arranging device 100 or the automatic wire arranging device 300 is in use, the plurality of the different characteristic core wires 201 which need arranging are capable of being received in the plurality of the first clamping slots 21 randomly by operators, the controller 10, the at least one driving device 101, the second wire clamping jig 30, the at least one charge-coupled device camera 40 and the at least one puncher pin 50 cooperate with one another to realize automatically distinguishing the different characteristics of the plurality of the core wires 201, including the colors of the plurality of the core wires 201 to arrange the plurality of the different characteristic core wires 201 in the plurality of the corresponding second clamping slots 31 separately, so that less workers are needed to save manpower and working hours are decreased, speeds of the automatic wire arranging device 100 or the automatic wire arranging device 300 arranging the plurality of the different characteristic core wires 201 of the cable 200 are improved and defect rates of the automatic wire arranging device 100 or the automatic wire arranging device 300 arranging the plurality of the different characteristic core wires 201 of the cable 200 are lowered. As a result, a cost of spot soldering the different characteristic core wires 201 of the cable 200 is lower.

What is claimed is:

1. An automatic wire arranging device for proceeding automatically arranging a plurality of different characteristic core wires of a cable, comprising:
    a controller;
    at least one driving device electrically connected with the controller;
    a first wire clamping jig, a top surface of the first wire clamping jig opening a plurality of first clamping slots arranged transversely for receiving the plurality of the core wires, a bottom wall of each of the plurality of the first clamping slots opening a through-hole penetrating through a bottom surface of the first wire clamping jig, the first wire clamping jig being connected with the at least one driving device, the at least one driving device being capable of driving the first wire clamping jig to perform transverse reciprocating movements;
    a second wire clamping jig disposed to a top of the first wire clamping jig, a bottom surface of the second wire clamping jig opening a plurality of second clamping slots arranged transversely;
    at least one charge-coupled device camera connected with the controller, the at least one charge-coupled device camera facing towards the plurality of the core wires received in the plurality of the first clamping slots, the at least one charge-coupled device camera being used for taking characteristic information of the plurality of the core wires received in the plurality of the first clamping slots separately, and the characteristic information of each of the plurality of the core wires being transmitted to the controller; and
    at least one puncher pin movably disposed to a bottom of the first wire clamping jig, the at least one puncher pin being connected with the at least one driving device, the at least one driving device driving the at least one puncher pin to be capable of performing up-down reciprocating movements with respect to the first wire clamping jig, when the at least one puncher pin moves upward, the at least one puncher pin being capable of penetrating through the through-hole and pushing against the core wire received in one of the plurality of the first clamping slots to be away from the one of the plurality of the first clamping slots and be blocked in one of the plurality of the second clamping slots corresponding to the one of the plurality of the first clamping slots.

2. The automatic wire arranging device as claimed in claim 1, wherein the at least one driving device includes a jig driving module, the first wire clamping jig is connected with the jig driving module.

3. The automatic wire arranging device as claimed in claim 2, wherein the jig driving module is a stepper motor.

4. The automatic wire arranging device as claimed in claim 1, wherein two facing inner surfaces of two opposite side walls of each of the plurality of the second clamping slots protrude towards each other to form two protruding portions, the plurality of the core wires are capable of being blocked in the plurality of the second clamping slots steadily by virtue of the two protruding portions of the two opposite side walls of each of the plurality of the second clamping slots.

5. The automatic wire arranging device as claimed in claim 1, wherein upper portions of two facing inner surfaces of two opposite side walls of each of the plurality of the second clamping slots slantwise extend outward away from each other to form two guiding slopes, under a condition of the plurality of the core wires having certain deformations, the plurality of the core wires are still able to be guided to the plurality of the second clamping slots separately and accurately by virtue of the guiding slopes of the side walls of the plurality of the second clamping slots.

6. The automatic wire arranging device as claimed in claim 5, wherein a distance between tops of the two guiding slopes is wider than a distance between bottoms of the two guiding slopes.

7. The automatic wire arranging device as claimed in claim 1, wherein the at least one driving device includes a cylinder driver, the at least one puncher pin is connected with the cylinder driver.

8. The automatic wire arranging device as claimed in claim 7, wherein the at least one driving device includes a driving motor, the cylinder driver is mounted to the driving motor, the driving motor is capable of driving the cylinder driver to drive the at least one puncher pin to move transversely.

9. The automatic wire arranging device as claimed in claim 1, wherein each of the plurality of the core wires has different characteristics, the different characteristics of each of the plurality of the core wires include a contour of each of the plurality of the core wires, a diameter of each of the plurality of the core wires and a color of each of the plurality of the core wires.

10. The automatic wire arranging device as claimed in claim 1, wherein the characteristic information includes color information.

* * * * *